(12) United States Patent
Mayernick

(10) Patent No.: US 9,089,240 B2
(45) Date of Patent: *Jul. 28, 2015

(54) POCKET BUN PAN

(71) Applicant: Robert Mayernick, South Bend, IN (US)

(72) Inventor: Robert Mayernick, South Bend, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/494,198

(22) Filed: Sep. 23, 2014

(65) Prior Publication Data

US 2015/0014327 A1    Jan. 15, 2015

Related U.S. Application Data

(63) Continuation of application No. 13/553,868, filed on Jul. 20, 2012, now Pat. No. 8,870,151.

(51) Int. Cl.
| | |
|---|---|
| *A47J 37/01* | (2006.01) |
| *A21B 3/13* | (2006.01) |
| *A21D 13/00* | (2006.01) |
| *A21D 8/06* | (2006.01) |

(52) U.S. Cl.
CPC . *A47J 37/01* (2013.01); *A21D 8/06* (2013.01); *A21D 13/0025* (2013.01); *A21B 3/133* (2013.01); *A21B 3/137* (2013.01); *A21B 3/139* (2013.01)

(58) Field of Classification Search
CPC ........ A21B 3/133; A21B 3/137; A21B 3/139; A21D 6/00; A21D 13/025; A47J 37/01
USPC .............. 249/63, 64, 66.1, 67, 74–76, 85, 92, 249/119–122, 124, 125, 126, 128, 129, 249/131–136, 139, 142, 160, 163, 175–177, 249/203, DIG. 1; 426/512–515; 220/528, 220/529, 549, 552, 555, 625, 638, 677

See application file for complete search history.

(56) References Cited

U.S. PATENT DOCUMENTS

| | | | | | |
|---|---|---|---|---|---|
| 557,685 | A | * | 4/1896 | Mains | 99/430 |
| 692,919 | A | * | 2/1902 | Schaumloeffel et al. | 249/136 |
| 1,702,253 | A | * | 2/1929 | Elliot | 249/64 |
| 1,738,301 | A | * | 12/1929 | Kornreich | 249/68 |
| 2,081,078 | A | * | 5/1937 | Watson | 126/373.1 |
| 2,168,005 | A | * | 8/1939 | Strietelmeier | 249/125 |
| 2,255,089 | A | * | 9/1941 | Simonds | 249/52 |
| 2,411,857 | A | * | 12/1946 | Harriss | 426/302 |
| 2,819,510 | A | * | 1/1958 | Vom Norden | 249/168 |

(Continued)

FOREIGN PATENT DOCUMENTS

| | | | | |
|---|---|---|---|---|
| DE | 4004786 A1 | * | 7/1990 | A21B 3/13 |
| FR | 2573628 A1 | * | 5/1986 | A21C 11/00 |

*Primary Examiner* — Yogendra Gupta
*Assistant Examiner* — Emmanuel S Luk
(74) *Attorney, Agent, or Firm* — Botkin & Hall, LLP

(57) ABSTRACT

The present disclosure describes a pan formed from a base plate, a housing, a divider and an ejection plate. Together, the pan is shaped to form a pocket bun. The constituent parts of the pan nest together when baking, and disassemble when removing the bun from the pan. The pocket bun has an open-mouth design to allow ingredients to be retained in the bun while the sandwich is being consumed. The open-mouth design is formed having either a single cavity or a plurality of cavities, with each cavity adapted for carrying a filling. The pan is designed having one or more chambers, with each chamber adapted for baking a bun. Adjacent chambers optionally include openings therebetween such that adjacent buns will have a baked connection therebetween.

12 Claims, 10 Drawing Sheets

(56) References Cited

U.S. PATENT DOCUMENTS

| | | | |
|---|---|---|---|
| 3,141,400 A * | 7/1964 | Powers | 249/82 |
| 3,379,120 A * | 4/1968 | Fogle | 425/346 |
| 3,432,027 A * | 3/1969 | Mueller | 206/527 |
| 4,190,229 A * | 2/1980 | Bradshaw | 249/124 |
| 4,566,668 A * | 1/1986 | Koppenberg | 249/60 |
| 5,538,217 A * | 7/1996 | Chauhan | 249/57 |
| 5,768,980 A * | 6/1998 | Degen | 99/426 |
| 5,897,900 A * | 4/1999 | Groulx et al. | 426/138 |
| 6,153,237 A * | 11/2000 | Ferguson | 426/115 |
| 6,540,200 B2 * | 4/2003 | Afolabi | 249/66.1 |
| 7,514,108 B2 * | 4/2009 | You | 426/18 |
| 8,152,130 B1 * | 4/2012 | Van Gelder | 249/119 |
| 8,870,151 B1 * | 10/2014 | Mayernick | 249/64 |
| 2008/0111050 A1 * | 5/2008 | Hamblin et al. | 249/61 |
| 2012/0308701 A1 * | 12/2012 | Campbell et al. | 426/503 |

* cited by examiner

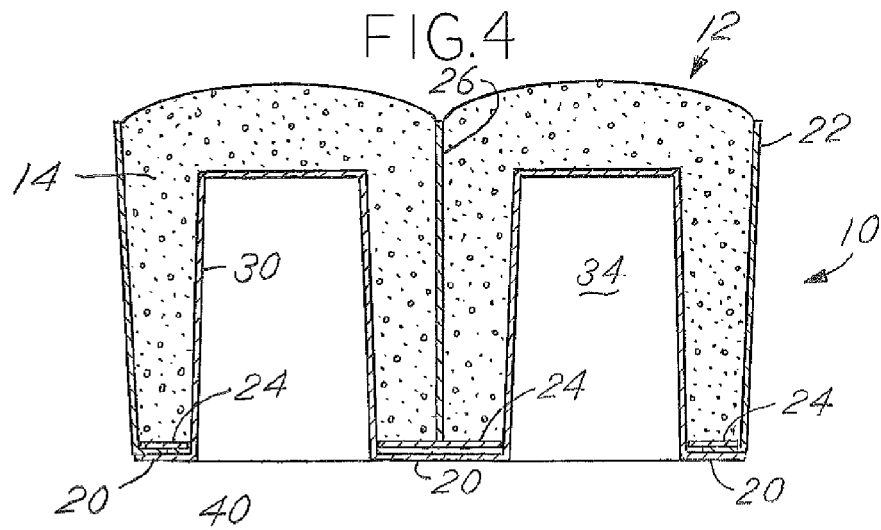
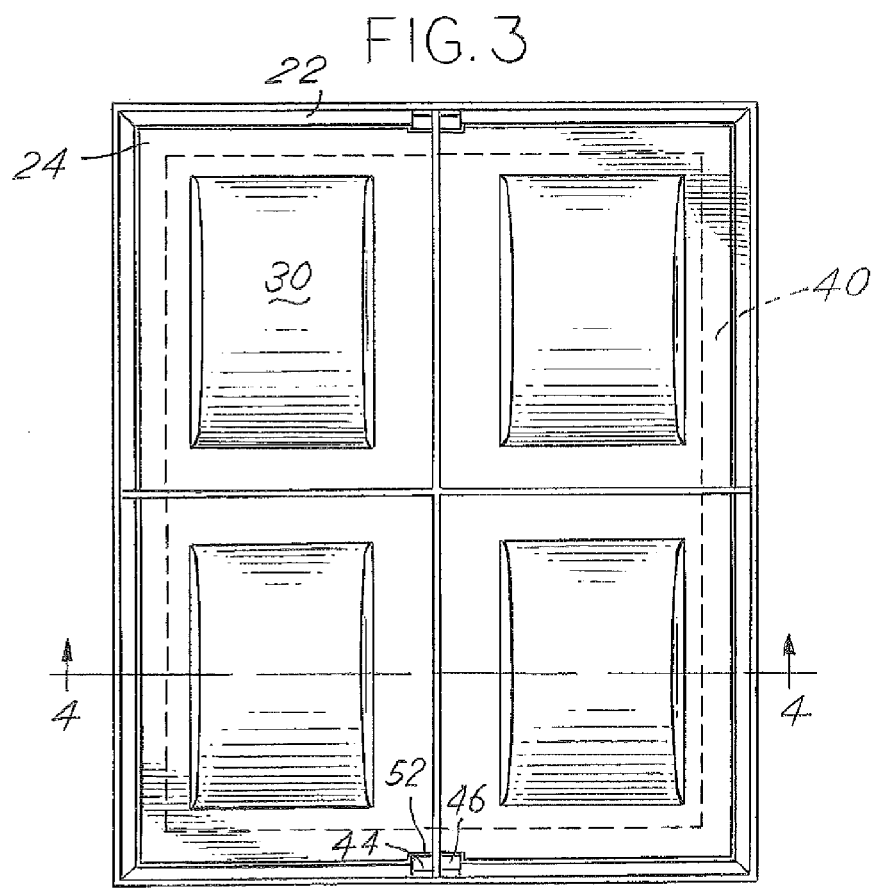

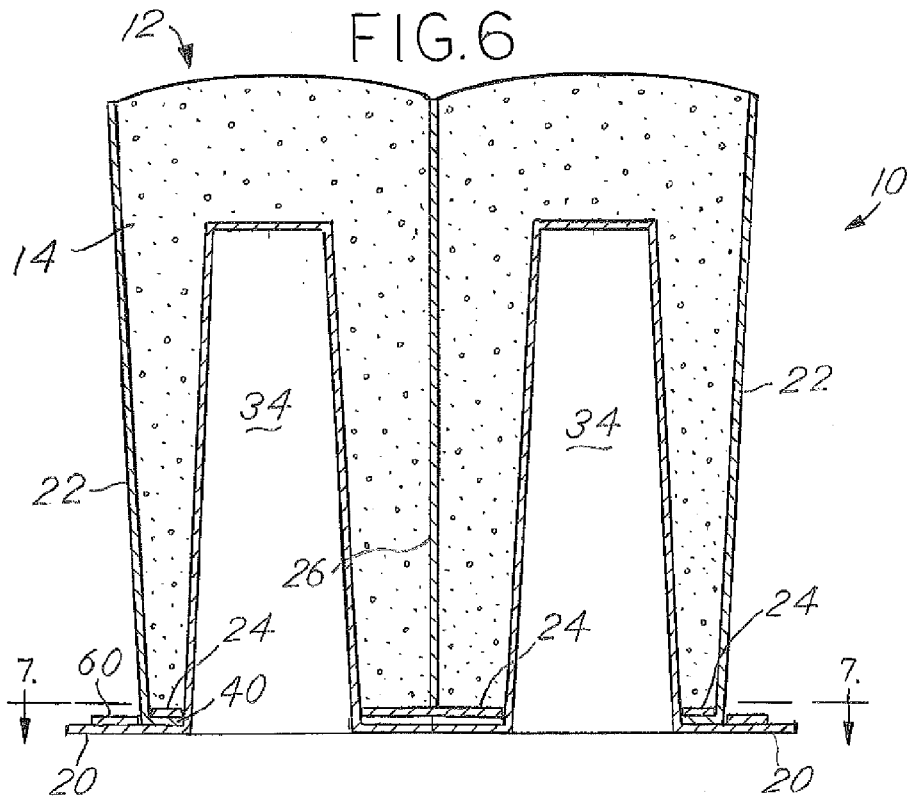
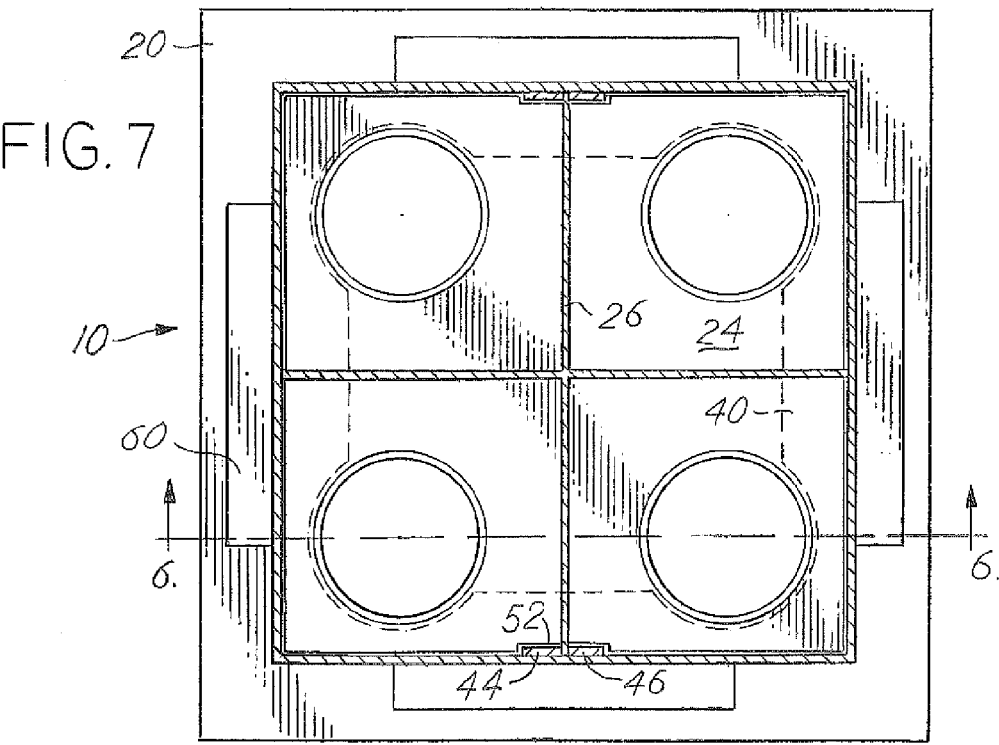

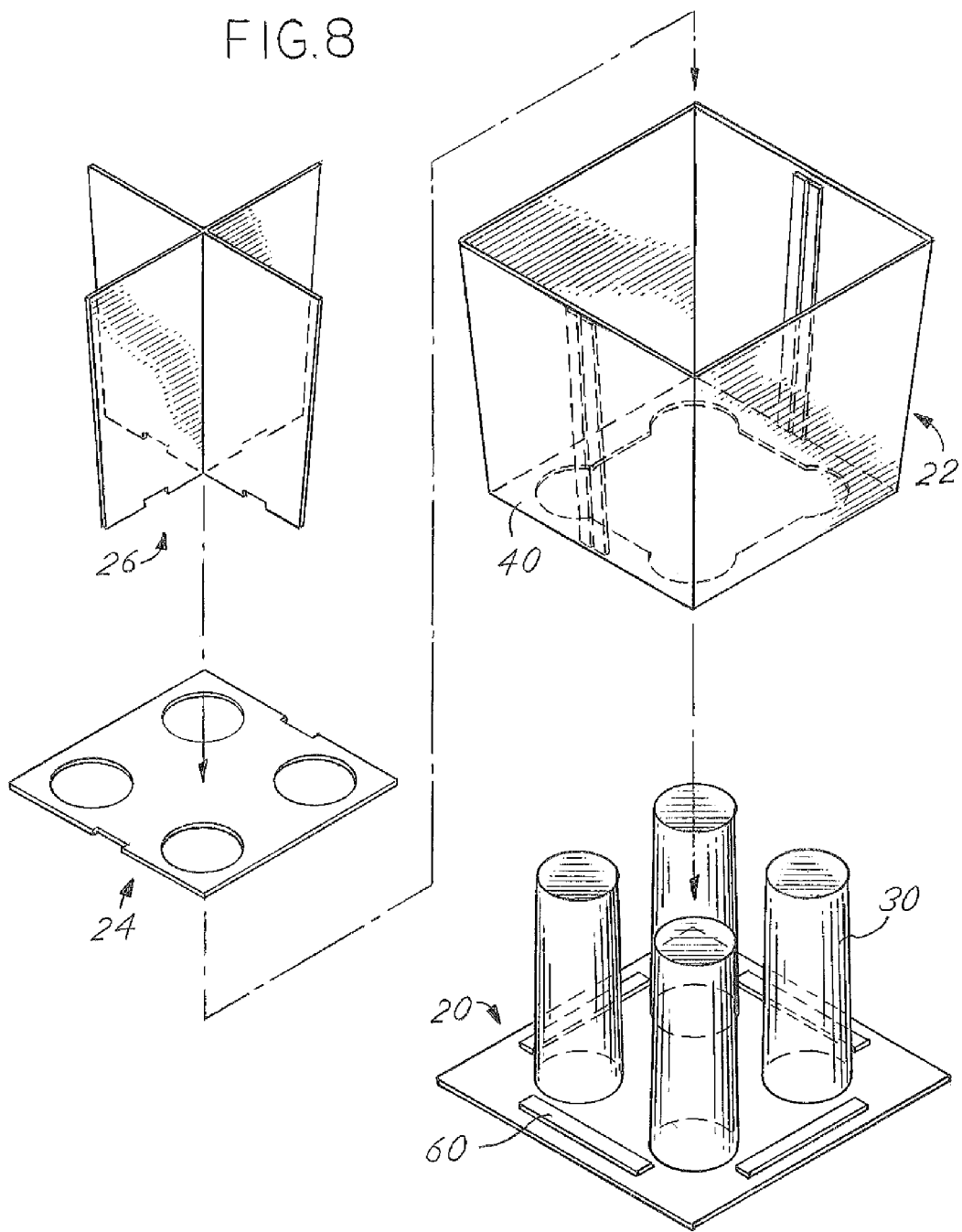

POCKET BUN PAN

CROSS REFERENCE TO RELATED APPLICATIONS

This application is a continuation of and claims the benefit of priority from the prior U.S. Pat. No. 8,870,151, filed on Jul. 20, 2012 and issued on Oct. 28, 2014, the entire contents of which are incorporated herein by reference.

BACKGROUND OF THE INVENTION

A typical sandwich is formed having a filling disposed between two pieces of bread. A hamburger is one common sandwich, with a ground beef patty, vegetables and condiments disposed between an upper and lower bun. Sometimes the bread is hinged, such as is used with a hotdog or sausage. The common failing of these types of sandwiches is that they can be difficult to eat tidily when on the go—the sandwich filling can leak out of the bread while being eaten. As such an improved bun is needed for containing sandwich filling. The disclosure provided herein describes an improved pan for baking a bun suitable for use in making a variety of sandwiches (including, but not limited to, hotdogs, sausages, hamburgers, sub sandwiches, loose meat sandwiches, among many others).

SUMMARY OF THE INVENTION

The present disclosure describes a pan for preparing an improved bun suitable for making various types of sandwiches. The pan described herein is composed of a base plate, a housing, an ejector plate and a divider. The pan, when assembled, is shaped to form a pocket bun therein. The pan is designed to be disassembled in a way to allow ready ejection of the pocket bun from the pan.

The pan may include a single chamber for producing a single bun, or multiple chambers for producing multiple buns from a single pan. One chamber may include a single male mold for producing a bun having a single cavity, or multiple male molds for producing a bun having multiple cavities. The divider separates the chambers and may include openings to allow buns in adjacent chambers to form a baked connector therebetween for holding the buns together during packaging.

The pan of the present disclosure includes further improvements over previous pans, including providing a pan with means for ejecting deep-draw goods from the pan such as through a pneumatic system or use of ejection pins. In one configuration, the pan of the present disclosure produces a bun having a plurality of cavities, such that food stuffs are independently insertable into each cavity. In an additional configuration, the shape of either the exterior of the bun or the cavity of the bun is formed with a distinctive shape so as to provide unique brand-identifying capabilities.

BRIEF DESCRIPTION OF THE DRAWINGS

A preferred embodiment of this invention has been chosen wherein:

FIG. 3 is a top view of the pan of FIG. 1;

FIG. 4 is a sectional side view of the pan of FIG. 3 as taken along line 4-4 and shown housing two buns;

FIG. 6 is a sectional side view of the pan of FIG. 7 as taken along line 6-6 shown housing two buns;

FIG. 7 is a top view of the pan of FIG. 5;

FIG. 8 is an exploded view of the pan of FIG. 5;

DESCRIPTION OF THE PREFERRED EMBODIMENT

Figure 15:
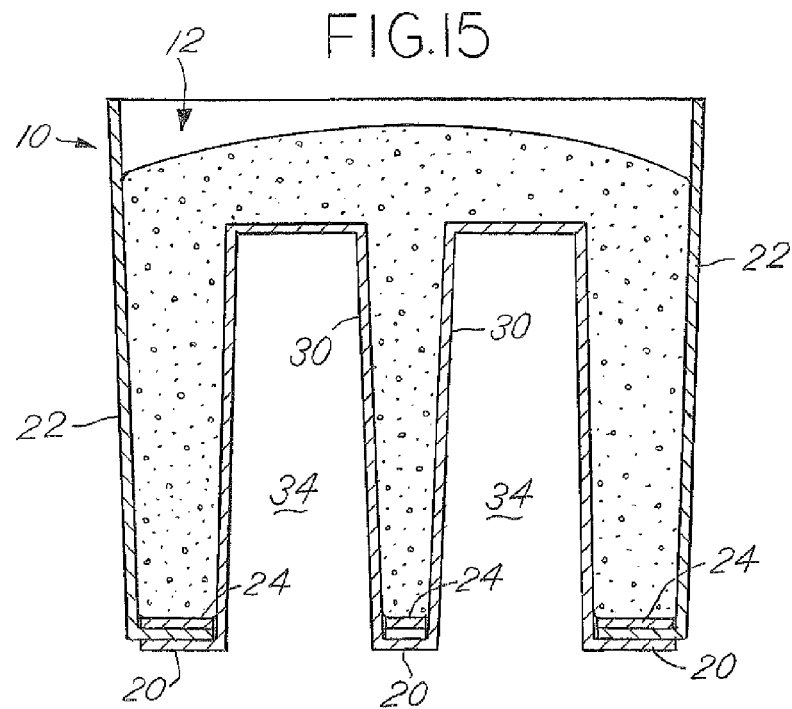
FIG. 15 is a sectional side view of a pan for forming a single bun having two cavities.
Figure 16:
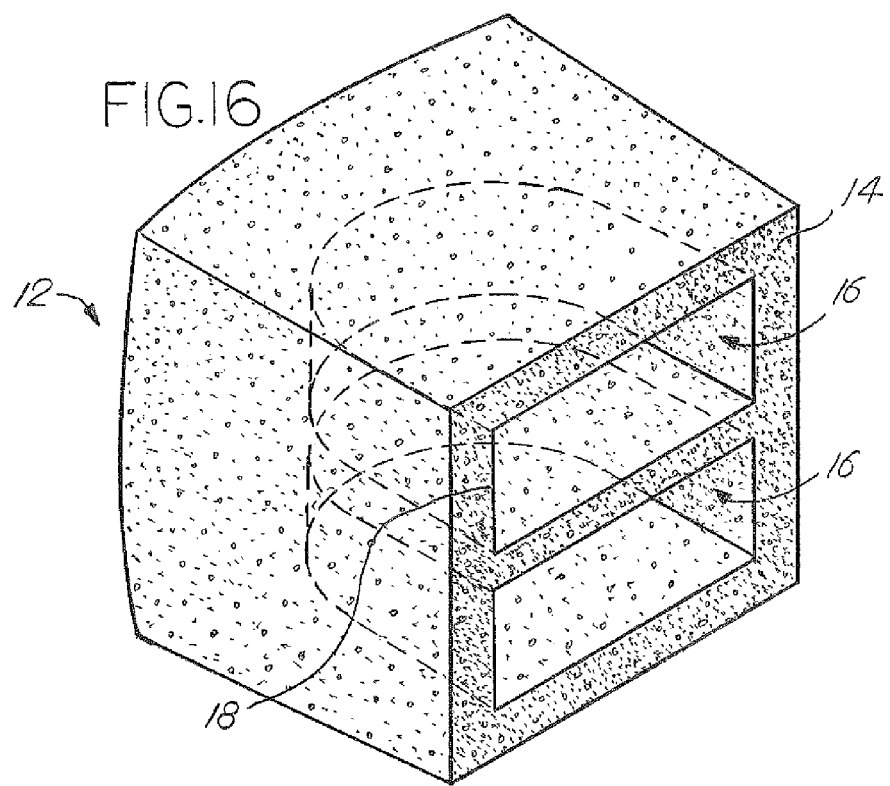
FIG. 16 is a perspective view of a bun formed from the pan of FIG. 15.

The present disclosure describes a pan 10 suitable for preparing a pocket bun 12. Pocket bun 12 is a molded object one embodiment of which is shown in FIG. 16, such as a food product or bun, formed having a wall 14 which defines a cavity 16 (other embodiments of bun 12 are shown in side-view in FIGS. 4, 6, 11, 12, and 15, where FIG. 16 shows a two-cavity bun, and the remaining figures show single-cavity buns). An opening 18 is formed through wall 14 and allows access to cavity 16. Cavity 16 and opening 18 together form an open mouth in pocket bun 12, with cavity 16 suitable for carrying food products, such as a hamburger, a hotdog, cold cuts, or any other food products and related condiments and dressings. The present disclosure is directed to pan 10, any references to pocket bun 12 should not be seen as limiting the uses of pan 10. It is understood that bun 12 formed in pan 10 is suitable for carrying a variety of sandwich fillings, and any reference to a specific type of filling is merely illustrative and does not limit the use of the bun. For example, any reference to hotdogs is only to illustrate the general shape of the bun, not to limit the bun from being used with other types of fillings.

As described herein, pan 10, and associated parts described in detail below, are referred to as having upper and lower ends. These designations are for ease of reference herein, with the upper end referring generally to the open top of pan 10, and the lower end referring generally to the base of pan 10 opposite the open top. It is understood that as used, pan 10 is positionable in any number of orientations, and as such any reference to upper and lower is not seen as limiting.

Figure 1:
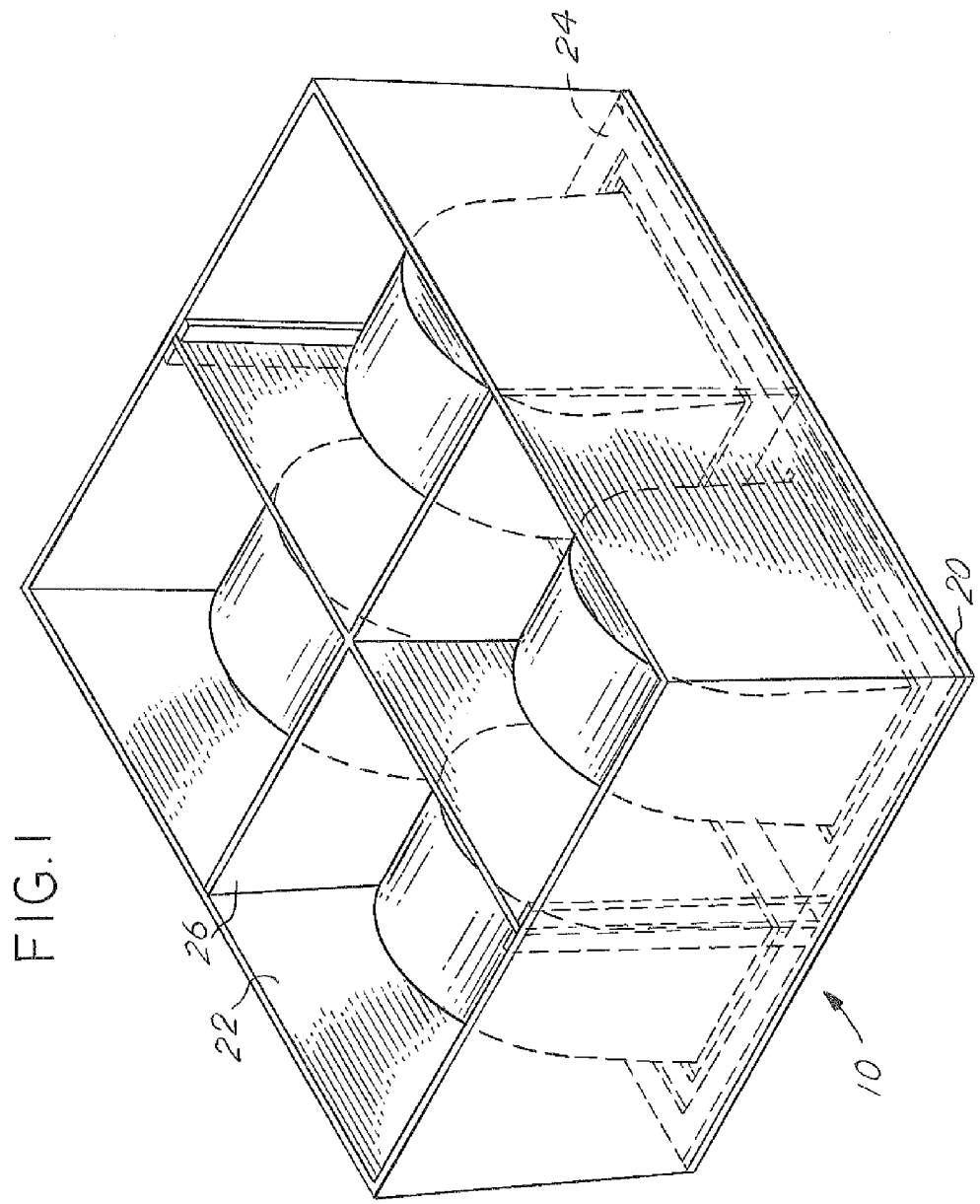
FIG. 1 is a perspective view of a pan suitable for forming one or more hamburger-accommodating pocket buns.
Figure 2:
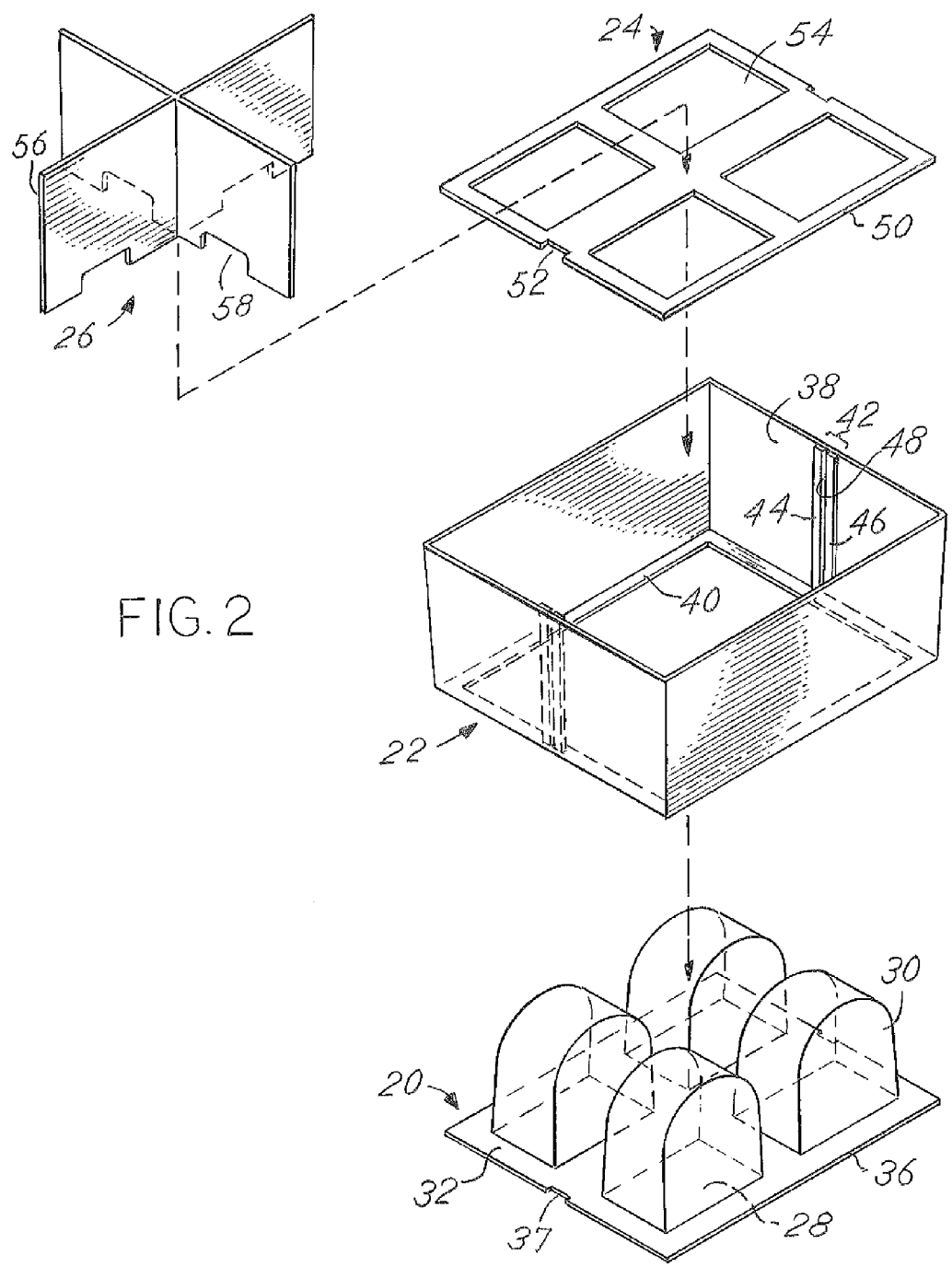
FIG. 2 is an exploded view of the pan of FIG. 1.

Pan 10 is formed from a group of nestable parts: a base plate 20, a housing 22, an ejection plate 24 and a divider 26, as shown assembled in FIG. 1 and in exploded view in FIG. 2. Base plate 20 is a generally flat plate having an aperture 28 passing therethrough and spaced inwardly from an outer edge 36. A male mold 30 extends from a top side 32 of base plate 20. Male mold 30 circumscribes aperture 28, such that male mold 30 defines a cavity 34 having an opening defined by aperture 28 (cavity 34 shown in FIG. 4). Male mold 30 is preferably tapered such that a cross-section of male mold 30 taken parallel to and proximate base plate 20 is larger than a cross-section of male mold 30 taken near the upper end. Male mold 30 is tapered to aid in ejecting bun 12 from pan 10. As shown in FIGS. 1-3, male mold 30 has a generally rectangular cross-section, though other cross-sections are suitable, see, for example, FIGS. 5-8 (round cross-section), FIG. 9 (octagon cross-section), and FIG. 10 (oval cross-section). Base plate 20 may include a single aperture 28/mold 30 combination, such as for preparing a single pocket bun 12, or alternatively may include an array of aperture 28/mold 30 combinations (as shown in FIG. 2), such as for preparing multiple pocket buns 12 using a single pan 10, or for preparing a single bun 12 having multiple cavities 16 (as shown in FIG. 15).

Housing 22, as shown in FIG. 2, is formed having an upright wall 38 defining an interior space, with a lip 40 extending inwardly from and inscribing the lower end of upright wall 38. When pan 10 is assembled, lip 40 overlies base plate 20. As shown in FIGS. 3 and 4, upright wall 38 is tapered such that the upper end is wider than the lower end, to ease removal of pocket bun 12 from pan 10. A guide 42 is positioned on the interior face of upright wall 38, with the guide formed from a first rail 44 and a second rail 46. First rail 44 is positioned generally vertically, and second rail 46 is offset from, and generally parallel to first rail 44. Rails 44, 46 are offset from one another such that a gap 48 is formed therebetween. The embodiment of housing 22 shown in FIG. 2 includes a pair of guides 42 positioned on facing surfaces of upright wall 38. In other embodiments, the number and positioning of guides 42 is variable depending on the number and positions of the aperture 28/mold 30 pairs of base 20. In additional embodiments, guides 42 are omitted from housing 22. It is contemplated that base 20 includes notches 37, such that base 20 is alternatively positionable sandwiched between housing 22 and ejector plate 24 with notches 37 locating base 20 relative housing 22.

Ejection plate 24 is defined as a generally flat plate having an outer edge 50. With pan 10 assembled, ejection plate 24 overlies lip 40 of housing 22. A notch 52 forms an indentation in edge 50, with notch 52 sized to straddle guide 42 when pan 10 is assembled, thereby notch 52 locates ejection plate 24 relative housing 22, as shown in FIG. 3. Ejection plate 24 includes an aperture 54 formed therethrough, aperture 54 is sized at least as large as the largest cross-section of mold 30, such that aperture 54 encircles mold 30 when pan 10 is assembled.

Divider 26 is defined as an upright plate overlying ejection plate 24 and subdividing the interior of housing 22 into multiple chambers. In the embodiments shown in FIGS. 2 and 8 divider 26 is X-shaped, with four plates joined together at the intersection formed therebetween. With pan 10 assembled, an outer edge 56 of divider 26 is located at gap 48 between first rail 44 and second rail 46 of guide 42, such that guide 42 retains divider 26 at a specified position within housing 26. Divider 26 includes a gap 58 formed at the bottom edge of divider 26. FIGS. 3 and 7 show a top view of pan 10 as assembled, where divider 26 is used to subdivide the pan into four quadrants, with each quadrant forming a chamber suitable for baking a pocket bun 12. Gap 58 provides an opening between adjacent chambers to allow adjacent pocket buns 12 to be joined together, such as to aid in keeping groups of pocket buns 12 together during processing or shipping. Gap 58 may be positioned at any of many suitable positions on divider 26, such as at the outer corners of divider 26 or at the intersection between the plates, or spaced between the corners and intersection as is shown in FIG. 2. It is contemplated that gap 58 may be omitted, thereby providing a pan 10 which completely segregates buns 12

Figure 13:
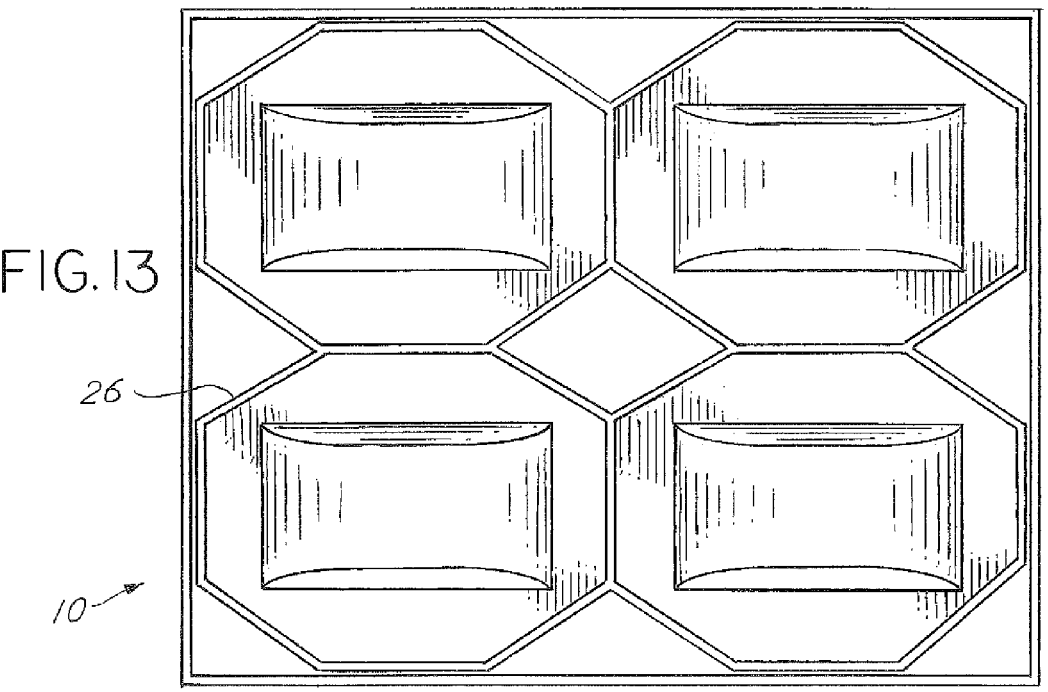
FIG. 13 is a top view of a pan showing a divider providing an octagon-shaped outer cross-section to the buns.
Figure 14:
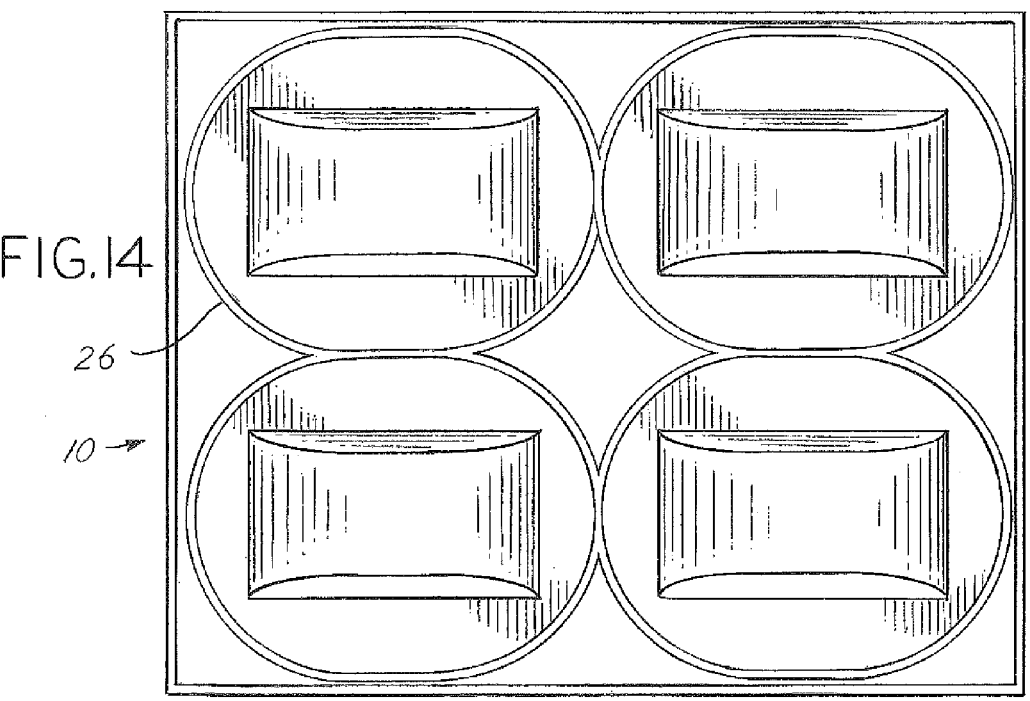
FIG. 14 is a top view of a pan showing a divider providing an oval-shaped outer cross-section to the buns.

It is contemplated, such as is shown in FIGS. 13 and 14, that divider 26 is shaped other than as an X to form buns of different shapes. It is also contemplated that divider 26 may be omitted and the resulting buns may be sliced into individual buns in a separate step. It is contemplated that gap 58 is omitted such that divider 26 forms a complete partition between adjoining chambers.

FIG. 3 is a top view of pan 10 showing ejection plate 24 overlying lip 40 of housing 22 (lip 40 shown in dotted line). Notch 52 of ejection plate 24 locating ejection plate 24 in house 22 relative guide rails 44, 46. Male molds 30 are shown extending up through ejection plate 24. It is contemplated that ejection plate 24 may be omitted.

FIG. 4 shows a side view of pan 10. Pocket bun 12 is shown in pan 10. FIG. 4 shows how the constituent parts of pan 10 stack together, with divider 26 overlying ejection plate 24, ejection plate 24 overlying lip 40 of housing 22, and lip 40 overlying base 20. Male mold 30 extends upwardly through ejection plate 24 into housing 22.

Figure 5:
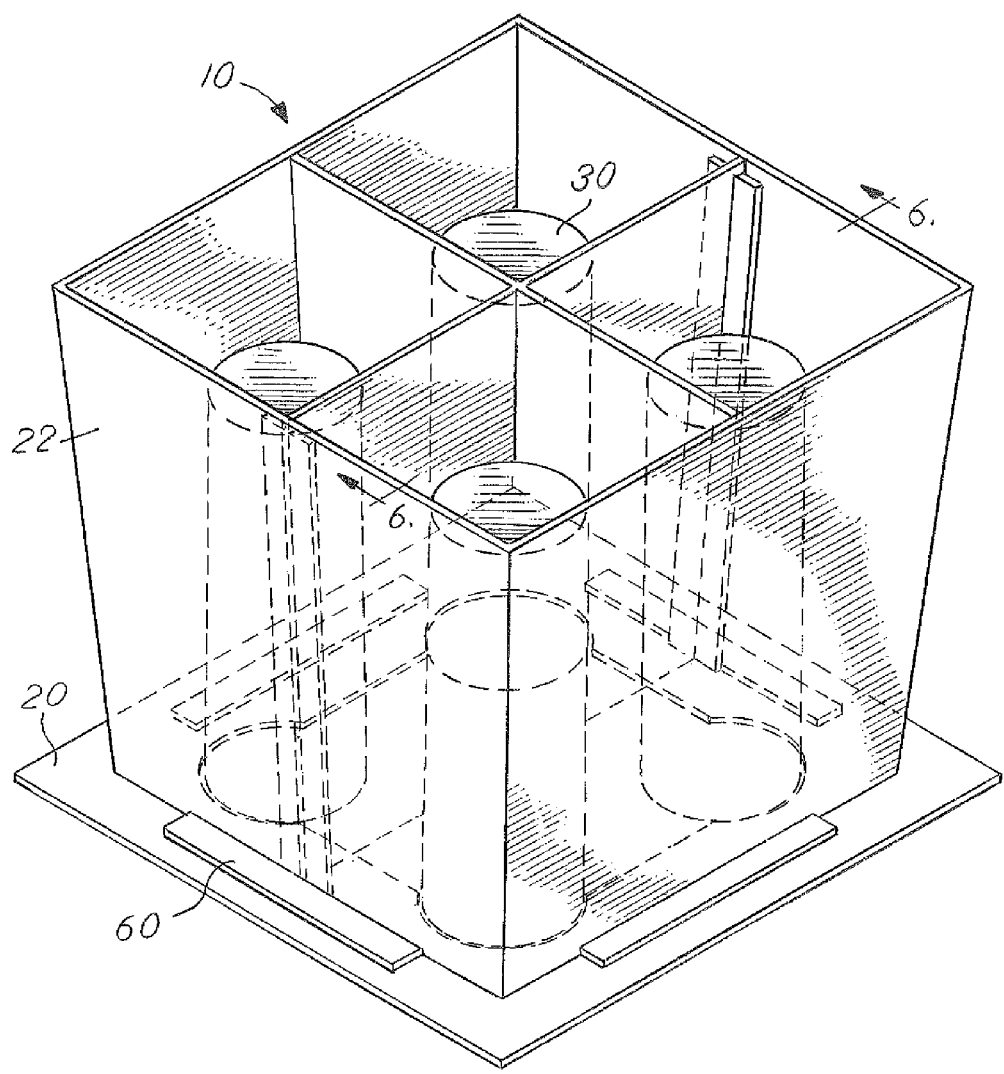
FIG. 5 is a perspective view of a pan suitable for forming one or more hotdog-accommodating pocket buns.

Referring now to FIGS. 5-8, in one embodiment pan 10 is shaped to form a bun 12 suitable for carrying a hotdog and associated condiments. As will be appreciated by comparing FIG. 1 and FIG. 5, each embodiment includes the same constituent parts: base 20, housing 22, ejection plate 24 and divider 26, the main difference being the relative dimensions and shape of the parts. For example, housing 22 of FIG. 5 is generally taller than that of FIG. 1 to allow for the forming of a long bun shaped to carry a hotdog. Similarly, male mold 30 of FIG. 5 has a circular cross-section to accommodate a hotdog.

FIG. 8 shows an exploded view of the constituent parts of the pan 10 of FIG. 5. FIG. 8 shows housing 22 and lip 40, with lip 40 contoured to match the shape of male molds 30. Base 20 includes spacers 60 which serve to locate housing 22 on base 20. Spacers 60 are raised bosses or strips extending from the surface of base 20 which contact the outer wall of housing 22 when pan 10 is assembled. FIG. 1 shows an embodiment of pan 10 which omits spacers 60. It is envisioned that pan 10 of FIG. 1 could be modified to include a spacer 60 by enlarging the dimensions of base 20. Likewise, it is envisioned that pan 10 of FIG. 8 could be modified to omit spacer 60.

FIG. 6 shows a cross-sectional side view of the embodiment of pan 10 showing how the constituent parts overly one another in assembled form. FIG. 6 is comparable to FIG. 4. Similarly, FIG. 7 is comparable to FIG. 3 in showing a top view of the respective embodiments of pan 10.

Figure 9:
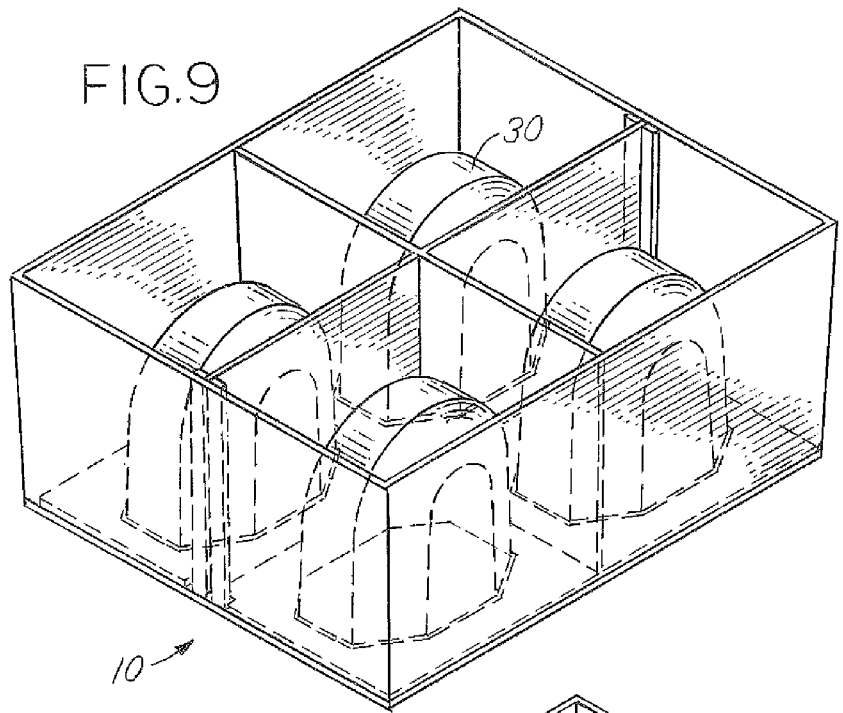
FIG. 9 is a perspective view of a pan showing the male mold having an octagon-shaped cross-section.
Figure 10:
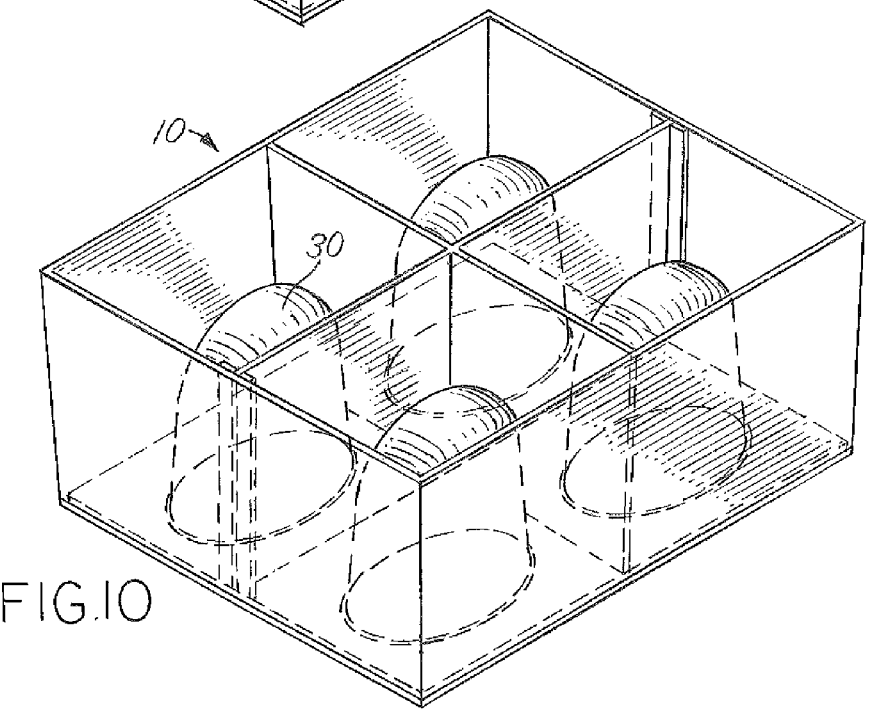
FIG. 10 is a perspective view of a pan showing the male mold having an oval-shaped cross-section.

FIGS. 9 and 10 show alternative shapes of male mold 30. FIG. 9 shows male mold 30 having an octagon-shaped cross-section. FIG. 10 shows male mold 30 having an oval-shaped cross-section. As is clear from FIGS. 9 and 10, male mold 30 is formable in any one of many possible cross-sectional shapes, which in turn forms the internal cavity of pocket bun 12 in the corresponding shape. As such, the shape of male mold 30 can be customized to allow for a specific type of food, or to allow for distinctive marketing or branding. The shape of male mold 30 may be customized on either the hamburger or hotdog accommodating bun pans. The cross-sections shown herein are merely illustrative, and should not be viewed as limiting. Such cross-sections are preferably polygon shaped. Such cross-sections are more preferably equi-angular polygons such as: triangle, square, pentagon, hexagon, heptagon, or octagon. Other shapes which provide brand-identification are suitable.

Figure 11:
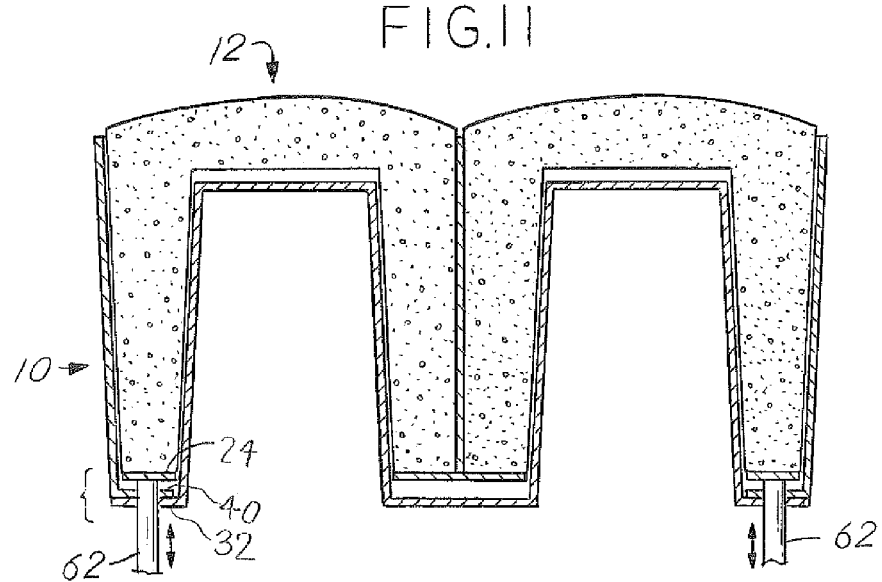
FIG. 11 is a sectional side view of the pan of FIG. 1 and showing the ejector pins.

FIG. 11 shows a sectional side view of pan 10, showing an auto-ejection system having ejection pins 62. Ejection pins 62 pass through apertures in base 20 such that when actuated, ejection pins 62 apply a force to ejection plate 24, to force bun 12 away from pan 10. Ejection pins 62 may be mechanically, pneumatically, electrically, manually, or otherwise actuated. Alternatively, ejection plate 24 is omitted and ejection pins 62 force housing 22 away from base 20, and housing 22 urges bun 12 out of pan 10. It is contemplated that base plate 20 is carried above lip 40 of housing 22, such that pin 62, when actuated, forced base 20 up and away from housing 22. Additionally, it is contemplated that pin 62, when actuated, contacts bun 12 directly, causing bun 12 to come free from pan 10.

Figure 12:
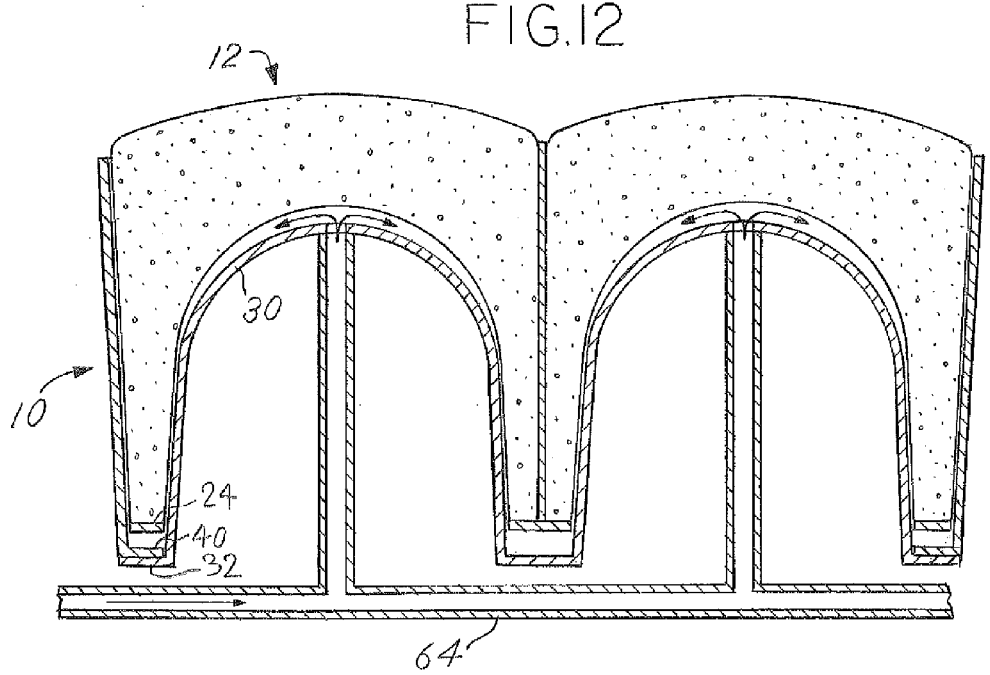
FIG. 12 is a sectional side view of the pan of FIG. 10, and showing an alternative ejector system.

FIG. 12 shows a sectional side view of pan 10 having an air manifold 64 for providing a pneumatic release system to pan 10, whereby air is used to force bun 12 free from pan 10. Manifold 64 is in fluid communication with apertures in male mold 30, such that when activated, air forces bun 12 away from pan 10. It is contemplated that ejector plate 24 may be omitted where manifold 64 is used to eject bun 12 from pan 10.

FIGS. 13 and 14 show alternative shapes of divider 26, such as to form a pocket bun 12 having an octagon-shaped outer cross-section (as in FIG. 13), or a pocket bun 12 having an oval-shaped outer cross-section (as in FIG. 14). The shape of divider 26 may be selected to yield the outer cross-section desired for a given pocket bun 12. The outer cross-section and cavity cross-section of pocket bun 12 may each be independently selected to yield a pocket bun 12 having desired characteristics, such as for brand identification or similar distinctive aesthetic enhancement of bun 12. The cross-sections shown herein are merely illustrative, and should not be viewed as limiting. Such cross-sections are preferably polygon shaped. Such cross-sections are more preferably equiangular polygons such as: triangle, square, pentagon, hexagon, heptagon, or octagon. Other shapes which provide brand-identification are suitable.

In one embodiment, a bun is formed having a pair of inner chambers. This embodiment is useful for building a three-layer sandwich, such as bun-filling-bun-filling-bun, as is common at some fast food restaurants. An example of this embodiment is shown in FIGS. 15 and 16. Here, pan 10 includes a pair of male molds 30 without a divider between them such that a bun 12 is formed having a pair of cavities. The dimensions shown in FIG. 16 are merely illustrative, the dimensions of bun 12 (such as the thickness of wall 14 or the relative size of cavity 16) may be varied according to the type of bun which is desired. The same can be said for a bun formed having a single cavity.

One advantage of bun 12 formed by pan 10 over prior art breads is that pan 10 forms a bun where both the outer surface and the cavity surface of bun 12 has a browned surface. Most buns, for example a common hamburger bun, have a browned outer surface, but the inner surface is not browned, but is formed by splitting the bread open. The present bun 12 includes an inner cavity having a browned surface such that when a filling is placed in the bun the filling contacts a browned surface and the browned surface serves to minimize the bread becoming soggy by resisting absorption of moisture from the filling. In this way, pan 10 bakes a bun 12 which resists becoming soggy.

The outer surface of bun 12 is browned either by direct contact from heated air when baking (such as is the case at the open top of pan 10), or by conductive heat transferred from pan 10 to the bun. Base plate 20 includes apertures 28 through which heated air enters the internal cavity of male mold 30, such that male mold 30 is heated during baking so as to brown the inner cavity 16 of bun 12. Browning the inner cavity 16 of bun 12 provides the beneficial effect of forming a filling-accepting portion of bun 12 which is resistant to becoming soggy.

Pan 10 is formed from a material sufficient at least to withstand the heat of baking, to retain shape when baking, and to transfer heat to brown bun 12 when baking. Such materials include, but are not limited to, aluminum, steel and other metals, silicone, tempered glass, ceramic, or composite. Any of such materials may include a non-stick coating.

Pan 10 is formed having an open top wherein the open top allow gases to escape from the pan when bun is being baked.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A pan adapted for baking bread comprising:
a base plate having a planar portion and multiple male mold portions having an upper surface and a lower surface, said male mold portions extending from said planar portion and terminating at a first distance, said base plate having a continuous surface;
a housing having upstanding walls intersecting a bottom, said upstanding walls intersecting adjacent upstanding walls to form a continuous perimeter wall, said upstanding walls having an interior surface and an exterior surface, said continuous perimeter wall having a top edge opposite said bottom, said bottom having an upper surface, a lower surface, and an aperture extending between said upper and lower surface adapted for receiving said male mold, said housing having guide rails affixed to opposing said upstanding walls, said guide rails protruding inwardly from said interior surface and having a gap between adjacent rails;
said lower surface of said bottom of said housing adapted to overlay a portion of said upper surface of said base plate, said housing having an open top located at said top edge, said open top separated from said lower surface of said bottom by a second distance, said second distance greater than said first distance;
an ejection plate adapted to overlay a portion of said upper surface of said bottom and having an upper and lower surface, said ejection plate having lateral sides to form a perimeter, an aperture extending between said upper and lower surface and located interiorly of said perimeter, said aperture adapted to receive said male mold, said ejection plate having notches complementary to said guide rails;
a removable divider having a wall with a lower edge adapted to abut said upper surface of said ejection plate, an upper edge, and an outer edge adapted to be received by said gap in said guide rails, said divider separating an interior volume of said housing and restricted from lateral movement with respect to said bottom of said housing; and
when said housing overlays said base plate and when said ejection plate overlays said bottom of said housing and when said male mold extends through said apertures of said housing and said ejection plate, said pan is adapted to releaseably bake said bread.

2. The pan according to claim 1, each of said upstanding walls obliquely angled with respect to said bottom, opposing said walls are further apart nearest said top edge.

3. The pan according to claim 2, said male mold being largest nearest said base plate and being smallest furthest said base plate.

4. The pan according to claim 1, said divider having a notch in said lower edge and extending upward therefrom, said notch forming a gap between said lower edge of said divider and said upper surface of said ejection plate.

5. The pan according to claim 4, when said bread is baked in said pan, said notch in said divider allows bread to connect between adjacent cavities.

6. The pan according to claim 1, said rails extending from said top edge to said bottom and located at an approximate midpoint of said opposing upstanding walls.

7. The pan according to claim 1, said base plate including a spacer extending outward from said upper surface, said spacer having an abutment surface adapted to abut a portion of said exterior surface of said housing when said bottom surface of said housing overlays said upper surface of said base plate, said spacer adapted to locate said housing between opposing lateral sides of said base plate.

8. The pan according to claim 1, said interior surface of said housing, said upper surface of said bottom, and said upper surface of said ejection plate having a non-stick coating.

9. The pan according to claim 1, said pan having a manifold adapted to inject fluid into said pan.

10. The pan according to claim 9, said male mold portion having an aperture extending therethrough and in fluid communication with said manifold.

11. The pan according to claim 10, each of said male mold portions in fluid communication with said manifold.

12. The pan according to claim 1, a portion of said removable divider adapted to be disposed between adjacent male mold portions.

* * * * *